Nov. 11, 1969     S. E. KAPPE     3,477,947
METHOD AND APPARATUS FOR TREATING WASTE MATERIALS
Filed Feb. 11, 1969     2 Sheets-Sheet 1

INVENTOR
Stanley E. Kappe
BY Dresser, Goldsmith, Clement & Gordon
ATTORNEYS

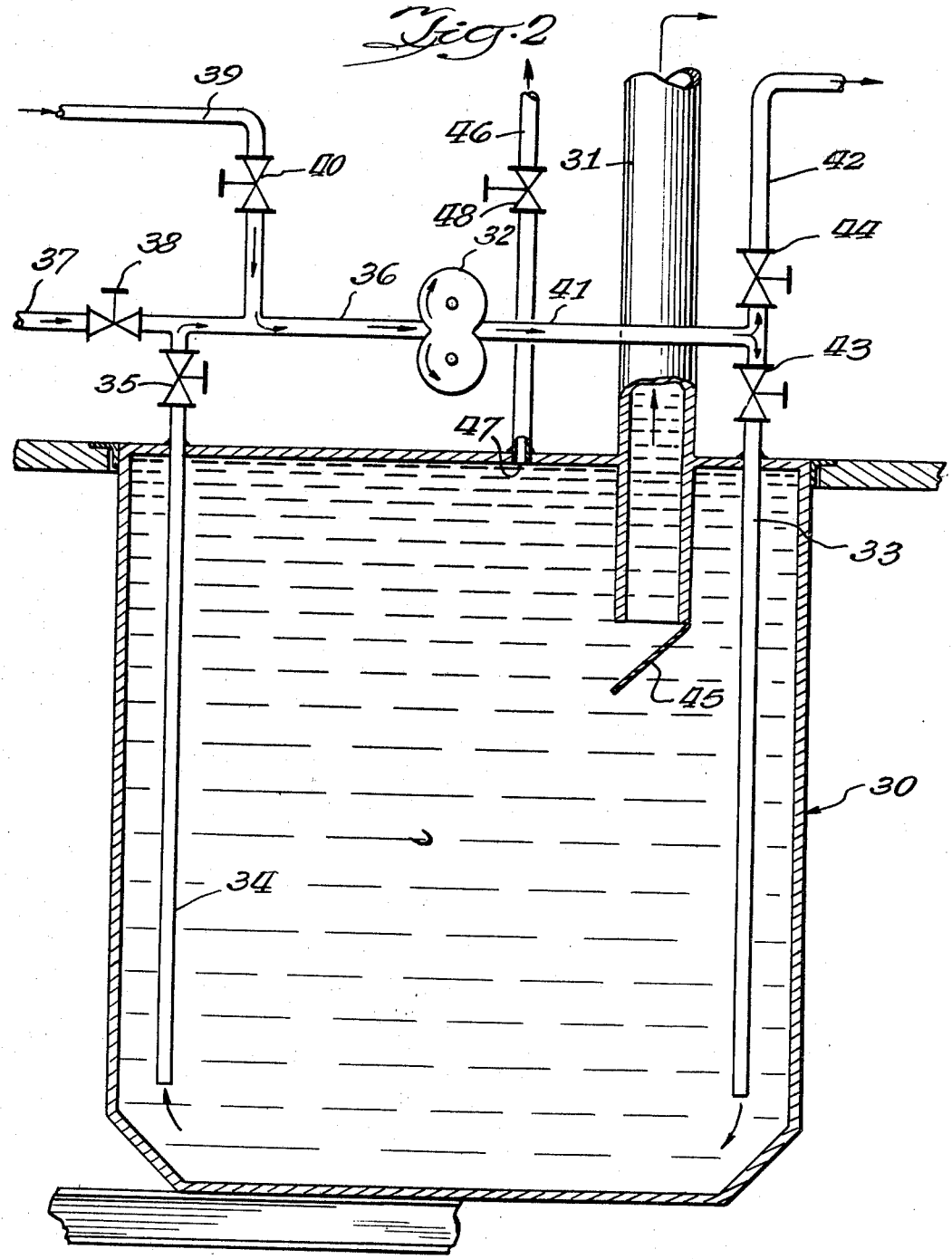

United States Patent Office 3,477,947
Patented Nov. 11, 1969

3,477,947
METHOD AND APPARATUS FOR TREATING WASTE MATERIALS
Stanley E. Kappe, Bethesda, Md., assignor to FMC Corporation, a corporation of Delaware
Continuation-in-part of application Ser. No. 510,091, Nov. 26, 1965. This application Feb. 11, 1969, Ser. No. 798,338
Int. Cl. C02c 5/04
U.S. Cl. 210—3
14 Claims

ABSTRACT OF THE DISCLOSURE

The method of treating waste materials such as aqueous sewage involves withdrawing from a holding tank quantities of mixed liquor in excess of that required for wasting, enriching the excess of withdrawn mixed liquor with oxygen, under conditions creating superatmospheric pressure, prior to or subsequent to mixing said excess of mixed liquor with influent sewage and introducing said enriched mixture to said holding tank where further reaction occurs to reduce the B.O.D. In a preferred embodiment, a holding tank closed at the top so that it can be pressurized, is equipped with a vertical standpipe, for discharge of effluent in volumes equal to the volume of influent waste, of a cross-sectional size providing flow rates for upwardly moving liquid less than the setting rate of solids in the mixed liquor entering said standpipe.

---

Figure 1:
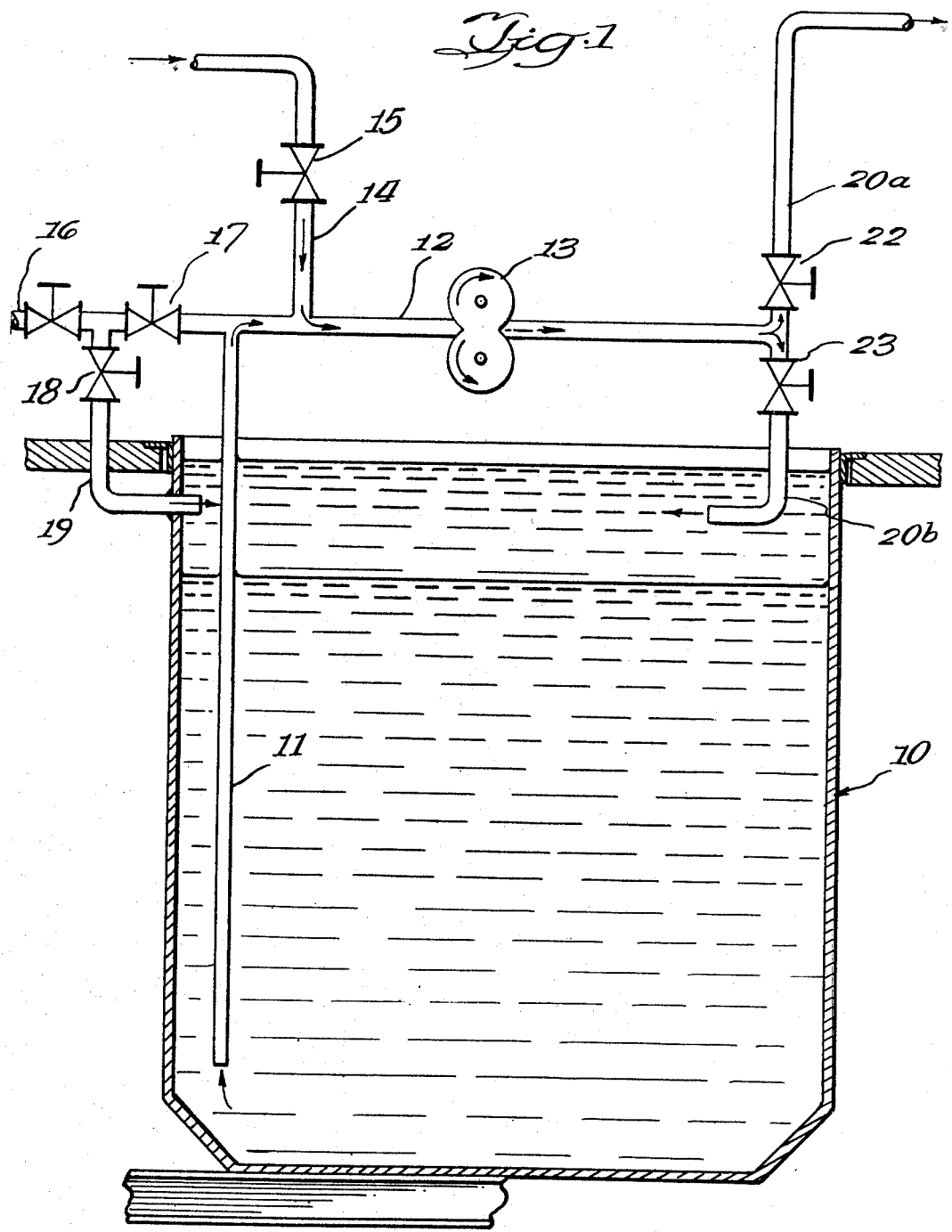

This application is a continuation-in-part of my copending application Ser. No. 510,091, filed Nov. 26, 1965, entitled Method of Treating Waste Materials, and now abandoned.

This invention relates to the treatment of aqueous waste materials. More particularly, it relates to an aerobic system for the treatment of sewage. Still more particularly, it relates to an aerobic system for treatment of sewage wherein the oxygenation requirements of the liquid being treated and the purifying organisms is met by the use of oxygen.

Briefly, the biological process of the present invention involves discharging from a holding zone volumes of mixed liquor in excess of that required for wasting, the withdrawn excess of mixed liquor being recirculated to said holding zone, commingling oxygen with the liquid being recirculated under conditions to create super-atmospheric pressure, and in quantities such that the available oxygen is maintained in excess of the biochemical oxygen demand, commingling fresh aqueous waste with the recirculated liquid prior to or subsequent to introduction of oxygen-containing gas and returning said oxygen-containing mixture under flow conditions to maintain turbulent mixing in said holding zone where biochemical action occurs to reduce the B.O.D.

Treatment of sewage by such aerobic processes as the activated sludge process and its many modifications, requires the activity of purifying organisms. To maintain their activity, the organisms must have available to them a supply of oxygen in the form of oxygen dissolved in water.

The conventional method of aerating, for example, mixed liquor is to dispose atmospheric air or compressed air into the mixed liquor in the form of bubbles so that a surface contact is established whereby air is dissolved and the oxygen content thereof becomes dissolved oxygen available to the organism.

Such systems are illustrated in patents such as Pirnie Patent No. 2,676,919 where air under pressure is introduced into a liquid stream moving downwardly in a vertical pipe. The air bubbles generally move upwardly countercurrent to the liquid flow during which countercurrent flow oxygen is dissolved from the air bubbles into the liquid. The liquid, after leaving the vertical pipe, gives up its entrained undissolved gas at an excess gas escape dome and moves to a quiescent reaction zone. Another system for introduction of oxygen is the Venturi aerator shown in Valdespino et al. Patent No. 2,271,304. In this system, the liquid passes through a Venturi submerged in the tank contents and entrains air which enters through a pipe communicating with the atmosphere. To accomplish transfer of oxygen into the liquid, the outlet from the Venturi aspirator must be deeply submerged in a tank so that the gas bubbles will be in contact with liquid a sufficient time for oxygen transfer before the gas bubbles rise to the liquid surface and escape into the atmosphere.

It has also been suggested heretofore that oxygen gas be substituted in whole or in part for the air being dispersed in mixed liquor. However, it has been shown that there is an upper limit to which the rate of aeration per unit of surface area could be raised when utilizing oxygen as the aeration medium. It has also been found that the use of oxygen-enriched air will only be advantageous in dispersion systems operating under oxygen limiting conditions, because as the dissolved oxygen increases, the oxygen transfer rate approaches that of plain air.

The amount of air which must be passed through an aqueous medium such as mixed liquor to satisfy the B.O.D. requirements and provide for some free dissolved oxygen as a safety measure in the event of fluctuations of B.O.D., depends upon the B.O.D. loading, and the temperature of the liquid medium, the latter a factor having a drastic effect upon liquid saturation values for dissolved air. When operating at atmospheric temperature and pressure, i.e., assumed conditions of 68° F. and 15 p.s.i., water dissolves approximately 2% of air by volume of which only approximately one-fifth is the oxygen necessary to support growth of aerobic organisms.

Fluctuations in B.O.D. content of the feed, particularly in plants operating close to design capacity, often is a problem, not only because additional compressor equipment may be needed to supply the required quantities of air for surge periods but introduction of that air, if made available, may not be physically possible with the disperser equipment available without lowering the oxygen absorption efficiency, which at best generally with a single bank of diffusers is in the range of 9% to 12%, to an uneconomically feasible level.

Another problem in the aerobic processes is the condition of sludge when it is recycled from the settling tank to the aeration tank. The condition of the sludge depends in large measure upon the length of time it has been withheld from a supply of oxygen. In a settling tank, the liquid quickly loses its dissolved oxygen either through utilization by the organisms or by escape in the air bubbles reaching the surface of liquid in the tank. The sludge thus may accumulate in the bottom of a settling tank where substantially anaerobic conditions exist and, if allowed to remain there too long, the sludge loses its activity, i.e., its ability to foster purifying action in the mixed liquor.

Now it has been discovered that the speed of purification of wastes being processed by an aerobic system can be enhanced by the presence of molecular oxygen in the mixed liquor-sewage mixture at the time of maximum oxygen demand of said mixture, i.e., at the time of first intimate contact of recycle or seed material with fresh waste material. Such a mixture of mixed liquor, sewage and oxygen has the intimacy of contact enhanced and speed of reaction accelerated when passed through strong agitation means.

The method for treating sewage in accordance with this invention involves bringing together fresh aqueous waste, mixed liquor and molecular oxygen under conditions maintaining oxygen solubility enhancing superatmospheric gas pressure on the oxygenation system which comprises the steps of establishing a mixed liquor in a liquid holding zone, continuously withdrawing mixed liquor from said holding zone in volumes exceeding the volume of aqueous waste entering the system, discharging a volume of liquid from the system equal to that entering the system, recirculating the portion of said withdrawn aqueous waste in excess of the volume of aqueous waste entering the system to said holding zone, commingling molecular oxygen in a pressurizable zone with said circulating stream of aqueous waste under superatmospheric pressure conditions which enhances oxygen solubility before introducing the same into said holding zone, said recirculated preoxygenated aqueous waste being introduced in volume and under conditions to maintain turbulent mixing in said liquid holding zone.

More in detail, the process of treating sewage in another embodiment comprises the steps of establishing a mixed liquor in a liquid holding zone which may be closed at the top so that, for example, in marine usage liquid will be contained despite pitch and roll of the vessel, continuously withdrawing mixed liquor from said holding zone in volumes exceeding the volume of aqueous waste entering the system, discharging from the system a volume of liquid equal to that entering the system, mixing the portion of said withdrawn mixed liquor not discharged from the system with influent fresh aqueous waste, introducing oxygen into said mixture of withdrawn mixed liquor and fresh aqueous waste and intimately commingling the mixture in a pressurizable zone under conditions creating superatmospheric pressure, introducing said commingled mixture into said holding zone where for example, if the holding zone is sealed pressure tight, superatmospheric pressure may be maintained, said recirculated preoxygenated aqueous waste being introduced in volume and under conditions to maintain turbulent mixing in said liquid holding zone.

Introduction of oxygen or oxygen-containing gas into the liquid in the pressurizable liquid zone separate from the holding zone or tank may take place in a pump suction line, within the pump itself or in the turbulent pump discharge piping system which returns the aerated mixture of mixed liquor and raw sewage to the holding tank. Preferably oxygen-containing gas is introduced on the suction side of the pump. When the mixture containing the gas is subjected to the violent agitation in the pump, the gas bubbles are subdivided into small dispersed bubbles with a large total surface area which facilitates relatively rapid transfer of a maximum quantity of oxygen into the dissolved oxygen state.

The quantity of oxygen dissolved by the aqueous medium is dependent upon temperature and pressure. If the temperature remains substantially constant, the quantity of gas dissolved will increase with increase in pressure on the system. The degree of development of superatmospheric pressure on the pump discharge side will depend primarily on the head capacity characteristics of the pump, the friction losses in the pumping system and the magnitude of the discharge head needed to pump the liquid out of the holding tank.

Pressure on the discharge side of the pump will be greater than that on the suction side just to create the energy needed to circulate the mixed liquor. However, the pressure on the discharge side of the pump can, if a valving system is used such as is set forth in the hereinafter described apparatus, be enhanced. For example, by partially closing the gate valve on the discharge side of the pump which permits discharge of some of the liquor overboard so that pumping is not entirely for recirculation, the pressure can be increased to the magnitude provided in the head capacity characteristics of the pump. In another embodiment, if the holding tank is pressure tight and is provided with a standpipe for discharge of effluent, the system pressure may be even greater by the amount of hydraulic head required to be overcome in causing the material discharged as effluent to rise the vertical distance required for escape from the standpipe. If the holding tank is, for example, in the bottom of a ship, the standpipe for discharge of effluent overboard, can have a vertical rise of as much as 30 feet or more which is a significant hydraulic head, i.e., the vertical distance from the top of the tank to the outlet from the pipe through which liquid is to be wasted from the system. Such a standpipe may serve a second purpose. If the standpipe is of appropriate cross-sectional area, the volume of liquid equal to the volume of influent waste being discharged therethrough may flow upwardly at a rate less than the settling rate of solids in the mixed liquor entering the standpipe. This permits the standpipe to act as a settling chamber whereby the activated solids settle back into the holding tank and a clarified liquid is discharged as effluent. Based upon the accepted figures for the design flow rates for final settling tanks, the rate of flow of liquor should not exceed about 0.089" per minute in the standpipe.

Circulating a substantial and significantly greater quantity of liquid than is entering the system as influent sewage out of and back into the holding tank under the pressure conditions developed, results in maintaining turbulent mixing conditions in the holding tank so that B.O.D. elimination continues after the mixture of influent sewage, mixed liquor and oxygen containing gas leaves the pump discharge piping system.

With introduction of oxygen into the stream and following allowance of a reaction time during which the mixture of sewage, recycle mixed liquor and oxygen is introduced into an accumulation or holding zone for a relatively large body of mixed liquor, biological treatment, typical B.O.D. reduction, in the absence of loading surges, is generally in the range between about 50% and 90% and usually is in the range between about 75% and 85%. Surges in B.O.D. or flow are smoothed out by mixing with an appreciable body of liquor i.e., the larger the recycle volume relative to the influent flow the smaller the B.O.D. fluctuations and consequently B.O.D. reductions in the instant process are consistently more uniform.

In one mode of operation, specifically designed for marine usage, mixed liquor is accumulated in a tank closed at the top by a suitable cover. Treated mixed liquor is withdrawn from the tank by a suitable pumping system capable of recirculating up to 20 volumes of designed incoming flow. Raw sewage is introduced into the pump suction line liquid before the liquid enters the pump. Oxygen gas is also introduced into the liquid material in the pump suction line. After mechanical mixing in the pump, the oxygenated mixed liquor is introduced into the body of mixed liquor in the tank. When this tank has accumulated a predetermined maximum quantity of mixed liquor, a predetermined quantity of material may be discharged from the system by splitting the stream being pumped or by a separate overflow to waste.

In this process, the recirculation stream generally will vary from 10 to 20 times the volume of incoming feed although quantities outside the range can be utilized when conditions of flow, B.O.D. content or other factors make lesser or greater quantities feasible. The quantity of recirculated material may vary considerably but should always be sufficient to maintain turbulent conditions for agitation and mixing of the holding tank contents. Molecular oxygen is introduced into the recycle stream in quantities to produce a dissolved oxygen content in the range required for aerobic purification, for example, between about 2 p.p.m. and 10 p.p.m.

The term molecular oxygen is intended to mean either air, gaseous oxygen in relatively pure form, so-called "atomic oxygen" which may be oxygen containing ozone, nascent oxygen freed, for example, by peroxide agents such as hydrogen peroxide and calcium peroxide, and the like.

The invention will be further understood from the following description of embodiments of the invention taken in conjunction with the accompanying drawings in which:

FIGURE 1 is a schematic side elevational view of a tank with alternative means for influent flow; and FIGURE 2 is a schematic side elevational view of a tank adapted with a vertical standpipe for discharge of effluent.

In the drawings, referring to FIGURE 1, the numeral 10 indicates a holding tank for liquid which is closed on the sides and bottom. Alternatively, tank 10 may be of conventional holding tank design adapted with a gasket cover to render the tank both liquid and gas tight in which event if the tank is to operate at atmospheric pressure the tank is provided with a vent closable by manual or automatic vent closing means. A pipe 11 communicates with the interior of tank 10 and conducts liquid suspensions to the inlet conduit 12 of a pump 13. Oxygen or oxygen-containing gas enters conduit 12 through air pipe 14 and valve 15. Raw sewage enters conduit 12 through pipe 16 and valve 17. Raw sewage may be introduced directly to tank 10 when valve 17 is closed and the sewage caused to flow through an open valve 18 and pipe 19.

Pump 13 delivers the mixture formed therein through discharge outlet pipe 20 into branch pipe 20a through valve 22 and into branch pipe 20b through valve 23.

FIGURE 2 illustrates an embodiment designed to operate under an enhanced hydraulic head. The numeral 30 indicates a holding tank for liquid which is closed on the sides, bottom and top so that the tank can be used as a pressurized container. Tank 30 is adapted with a vertical atmospheric leg or standpipe 31. Standpipe 31 is of a diameter correlated with the volume of influent flow of raw sewage to provide a flow rate in the standpipe in cubic feet per second less than the settling rate of the average size particulate material entrained in or suspended in the liquid entering said standpipe. The vertical length of standpipe 31 determines the hydraulic head which must be developed by a pump 32 to cause clarified liquid to discharge from holding tank 30 through standpipe 31. This hydraulic head is an increase in pressure on the system which enhances the solubility of gases by maintaining superatmospheric pressure on the liquid in the holding tank 30.

Holding tank 30 is provided with conduit means 33 for introduction into the contents thereof of a mixture of raw sewage, recycle mixed liquor and oxygen-containing gas. Holding tank 30 is also provided with an outlet conduit 43 which communicates with an area of the tank adjacent the bottom thereof but distantly removed from the point of introduction of influent mixture.

Outlet conduit 34 is provided with valve means 35 and communicates with the inlet conduit 36 of pump 32. Raw sewage enters inlet conduit 36 through pipe 37 and valve means 38. Oxygen-containing gas enters inlet conduit 36 through gas pipe 39 and valve means 40.

Pump 32 discharges aerated liquid mixture through outlet conduit 41. Outlet conduit 41 conveys aerated mixture to branch conduits 33 and 42. Liquid flow to tank 30 through conduit 33 is controlled by valve 43 and liquid flow to waste through branch conduit 42 is controlled by valve 44.

Standpipe 31 is provided with a gas deflector 45 to reduce to a minimum the quantity of gas which can enter the standpipe and by adhering to solids interfere with the settling action occurring therein. Means for escape of any gas accumulating at the top of the pressurized tank is provided by a vent pipe 46 which communicates with the interior of tank 30 through port 47 in the top thereof. Gas flow through vent pipe 46 is controlled by a manual or automatic air release valve 48.

The process will be further understood from the following detailed example.

Example

When sewage is to be treated at a design rate of 10,000 gallons of raw sewage per day, the volume of mixed liquor being held under aeration, i.e., in the accumulation zone, will be 680 cubic feet with an average loading rate of about 24 pounds of B.O.D. per 1000 cubic feet of accumulation tank volume per day. Mixed liquor, after treatment, is recirculated by a pump having a capacity of 100 gallons per minute. Raw sewage is introduced to the system and effluent is discharged at a rate of 10,000 gallons per day, the effluent produced having less than 50 mg. per liter of B.O.D. Pure oxygen is introduced into the recycle stream at a rate of 0.666 pound per hour. This recirculated material will maintain an oxygen content in the mixed liquor of approximately 3 parts per million.

In another embodiment, mixed liquor is accumulated in a tank of the size described in the example and having the structure described in FIGURE 2, was provided with a standpipe of 30 foot length and 24 inches in diameter for separation of at least a portion of the solids in the stream being discharged as an effluent. Liquor discharged through this standpipe at a rate of 7½ gallons per minute carries an average solids content of less than 20 p.p.m. The effect of the standpipe is to create a hydraulic head and to increase the pressure in the tank and to make possible greater oxygen absorption. Mixing of oxygen-enriched mixed liquor and fresh sewage, also may take place in the pressurized tank at a point removed from the base of the standpipe.

The above detailed description of this invention has been given by way of illustration without any intention that the invention be limited to the exact conditions set forth. No unnecessary limitations should be understood therefrom as modifications will be obvious to those skilled in the art.

I claim:

1. A biological method of treating aqueous waste material involving bringing together fresh aqueous waste, mixed liquor and molecular oxygen under conditions maintaining oxygen solubility enhancing superatmospheric gas pressure on the system which comprises the steps of establishing a mixed liquor in a liquid holding zone, continuously withdrawing mixed liquor from said holding zone in volumes exceeding the volume of aqueous waste entering the system, discharging a volume of liquid from the system equal to that entering the system, recirculating the portion of said withdrawn aqueous waste in excess of the volume of aqueous waste entering the system to said holding zone, commingling molecular oxygen with said circulating stream of aqueous waste in a separate pressurizable zone under superatmospheric pressure conditions which enhances oxygen solubility before introducing the same into said holding zone, said recirculated preoxygenated aqueous waste being introduced in volume and under conditions to maintain turbulent mixing in said holding zone.

2. A biological method of treating aqueous waste material involving bringing together fresh aqueous waste, mixed liquor and molecular oxygen under conditions maintaining oxygen solubility enhancing superatmospheric gas pressure on the system which comprises the steps of establishing a mixed liquor in a pressurized holding zone, continuously withdrawing mixed liquor from said holding zone in volumes exceeding the volume of aqueous waste entering the system, discharging a volume of liquid from the system equal to that entering the system, mixing the portion of said withdrawn mixed liquor not discharged from the system with influent fresh aqueous waste, introducing oxygen into said mixture of withdrawn mixed liquor and fresh aqueous waste and intimately commingling the mixture under conditions creating superatmospheric pressure in a pressurized liquid zone, introducing said commingled mixture into said pressurized holding zone where the superatmospheric pressure is maintained, said recirculated preoxygenated aqueous waste being introduced in volume and under conditions to maintain turbulent mixing in said gas liquid holding zone.

3. The method according to claim 2 wherein the commingled mixture is introduced into said pressurized holding zone at a pressure overcoming the hydraulic head created by a vertical atmospheric leg whereby a volume of liquid equal to the volume of influent waste discharges through said atmospheric leg.

4. The method according to claim 3 wherein the pressure induced outflow of liquid is through said vertical atmospheric leg which is of a length greater than 10 feet.

5. The method according to claim 3 wherein the influent sewage in the commingled mixture is introduced into said pressurized holding zone at a rate to create a volume flow through said vertical atmospheric leg at a rate less than the setting rate of the particulate material suspended in said liquid entering said vertical atmospheric leg.

6. The method according to claim 1 in which the aqueous waste material to be treated is organically polluted waste waters.

7. The method according to claim 1 wherein aqueous waste and oxygen are commingled with the circulating portion of mixed liquor and the resultant mixture introduced into the accumulation zone.

8. The method according to claim 1 wherein oxygen is commingled with the circulating portion of mixed liquor and the oxygen-contained mixed liquor and fresh aqueous waste are separately introduced into the mixed liquor in said accumulation zone for reaction reducing the B.O.D. of the accumulation zone contents.

9. The method according to claim 1 in which molecular oxygen is introduced in quantities to produce in the commingled mixture a dissolved oxygen content adequate to produce aerobic purification.

10. The method according to claim 1 wherein sewage and oxygen are introduced into the circulating portion of the mixed liquor prior to mechanical agitation involved in introducing the resultant mixture of sewage, mixture withdrawn from the accumulation zone and oxygen into the aqueous mixture in said accumulation zone.

11. The method according to claim 1 wherein the effluent from the accumulation zone is discharged through means enhancing the hydraulic head on the holding zone whereby greater oxygen absorption is effected.

12. The method according to claim 1 wherein marine application sewage is processed ta a rate of 10,000 gallons of raw sewage per day, said sewage having an average loading rate of about 24 pounds of B.O.D. per 1000 cubic feet of accumulation tank volume with a recirculation of mixed liquor at a rate of about 100 gallons per minute and an effluent is discharged having less than 50 mg. per liter of B.O.D.

13. Apparatus for treating aqueous waste material comprising a liquid holding tank closed at the bottom, sides and top, means for inducing liquid movement, piping means communicating at one of its ends with the interior of said tank for the removal of aqueous mixture and at the other end with said means for inducing liquid movement in said piping means, conduit means for introducing of raw aqueous waste into said piping means, tubular means for introduction of oxygen-containing gas into said piping means, branched outlet piping means for said means for inducing liquid movement communicating through one branch with the interior of said tank and communicating through its second branch with the atmosphere and means for control of flow through said branches.

14. The apparatus according to claim 13 wherein the liquid holding tank is closed at the top and is provided with an overflow conduit of cross-sectional size to provide upward liquid flow rates for discharge of a volume of liquid equal to that of the raw aqueous waste being introduced through said conduit means less than the settling rate of solids carried in liquid entering said conduit from said tank.

References Cited
UNITED STATES PATENTS

| | | | |
|---|---|---|---|
| 2,676,919 | 4/1954 | Pirnie | 210—258 X |
| 3,271,304 | 9/1966 | Valdespino et al. | 210—15 |
| 2,118,370 | 5/1938 | Wessblad et al. | 210—15 X |
| 2,270,869 | 1/1942 | Ditto et al. | 210—15 X |
| 3,054,602 | 9/1962 | Proudman | 210—15 X |
| 3,300,402 | 1/1967 | Grich et al. | 210—8 X |
| 3,371,033 | 2/1968 | Simmons et al. | 210—197 X |

OTHER REFERENCES

McKinney, R. E., Complete Mixing of Activated Sludge, W. & S.W., Reference To. 1960, pp. R–273 through R–275, R–278 and R–279.

MICHAEL E. ROGERS, Primary Examiner

U.S. Cl. X.R.

210—194

PO-1050
(5/69)

UNITED STATES PATENT OFFICE
CERTIFICATE OF CORRECTION

Patent No. 3,477,947          Dated November 11, 1969

Inventor(s) Stanley E. Kappe

It is certified that error appears in the above-identified patent and that said Letters Patent are hereby corrected as shown below:

Column 1, line 63, "dispose" should be -- disperse --;

Column 5, line 52, "43" should be -- 34 -- ;

Column 5, line 52, "wfith" should be -- with -- ;

Column 7, line 5, after "gas" the word "tight" should be inserted;

Column 7, line 20, "setting" should be -- settling -- ;

Column 8, line 1, "ta" should be -- at -- .

SIGNED AND
SEALED

JUN 23 1970

(SEAL)
Attest:

Edward M. Fletcher, Jr.
Attesting Officer

WILLIAM E. SCHUYLER, JR.
Commissioner of Patents